Jan. 5, 1926. 1,568,375
E. GILLETT
LATH RACK OR HOLDER
Filed April 29, 1925 2 Sheets-Sheet 1
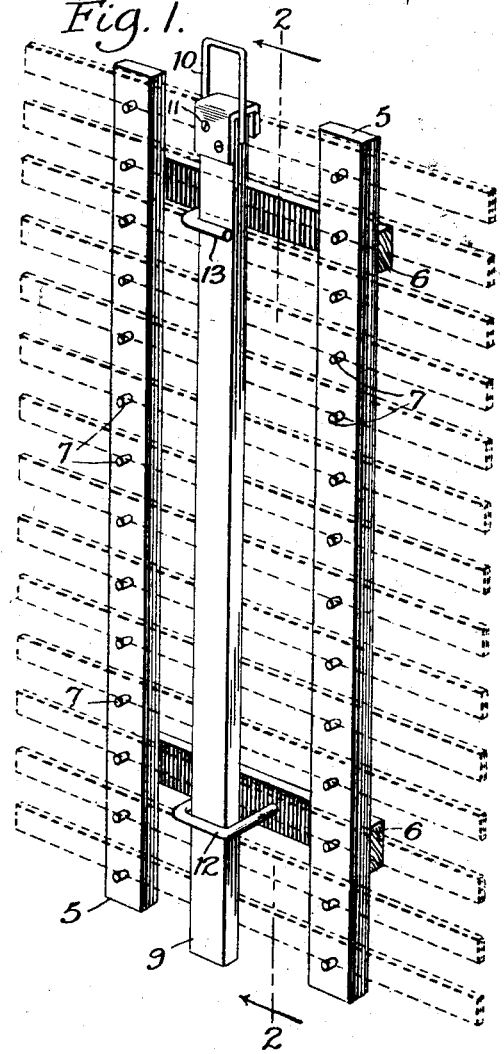
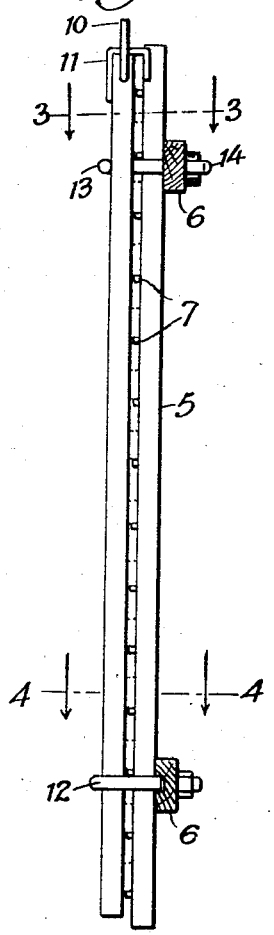
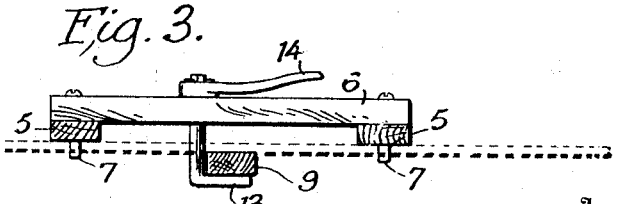
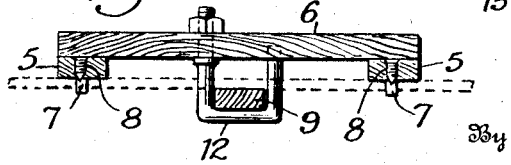
Inventor
Eugene Gillett
By Dowell & Dowell
his Attorneys Jan. 5, 1926. 1,568,375
E. GILLETT
LATH RACK OR HOLDER
Filed April 29, 1925    2 Sheets-Sheet 2
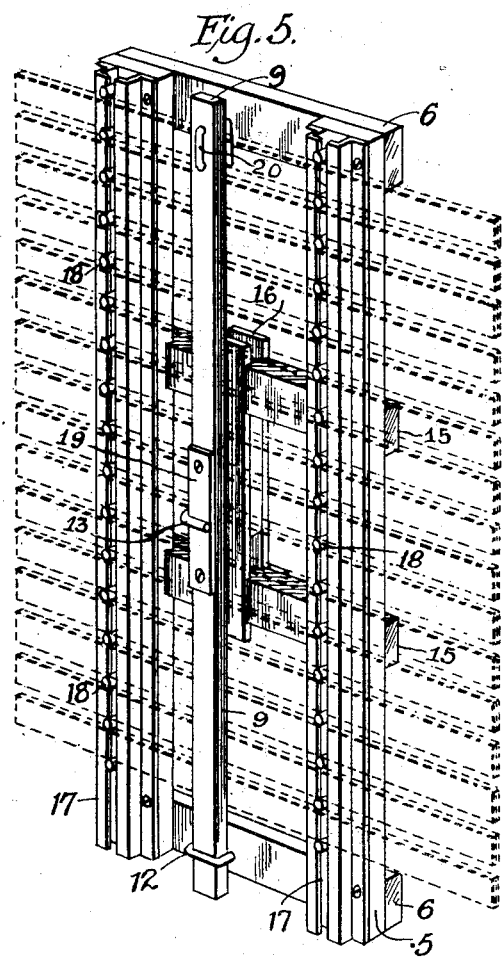
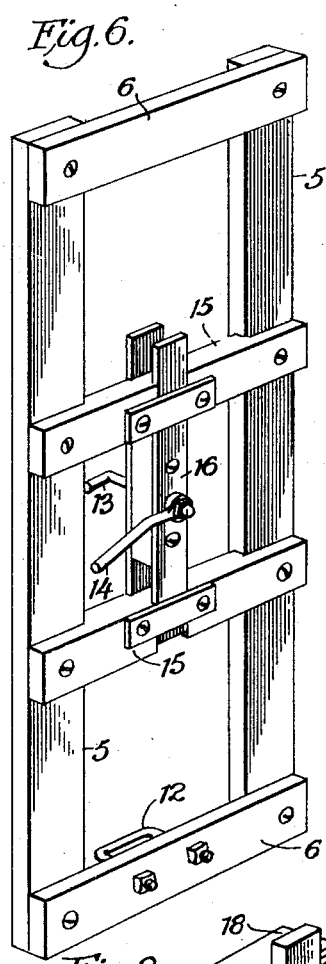
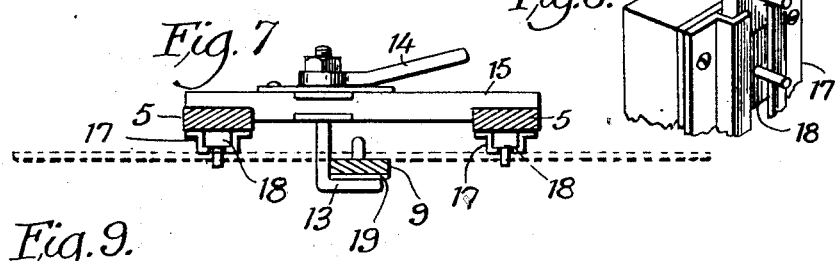
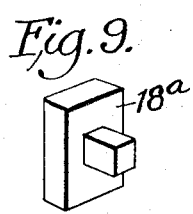
Inventor
Eugene Gillett
By Dowell & Dowell
his Attorneys Patented Jan. 5, 1926.

1,568,375

UNITED STATES PATENT OFFICE.

EUGENE GILLETT, OF LONG BEACH, CALIFORNIA.

LATH RACK OR HOLDER.

Application filed April 29, 1925. Serial No. 26,746.

*To all whom it may concern:*

Be it known that I, EUGENE GILLETT, a citizen of the United States, residing at Long Beach, in the county of Los Angeles and State of California, have invented certain new and useful Improvements in Lath Racks or Holders; and I do hereby declare the following to be a full, clear, and exact description of the invention, such as will enable others skilled in the art to which it appertains to make and use the same.

This invention relates to lath racks and the principal object is to provide a device for holding a group or number of laths in spaced relation for nailing to the walls and ceilings of a building.

A further object is to provide a simple, convenient and inexpensive device of the character referred to, upon which a number of laths may be quickly assembled and securely held in position against the studding or joists of a wall or ceiling, for and during the nailing operation and which may be readily removed or withdrawn therefrom for replenishment after the several laths have been affixed or nailed in place, thus facilitating and expediting the work.

The invention will be first hereinafter more particularly described with reference to the accompanying drawings, which are to be taken as a part of this specification and then pointed out in the claims at the end of the description.

In said drawings, Fig. 1 is a perspective view of my improved lath rack or holder, showing a group or number of laths clamped in proper spaced relation thereon;

Fig. 2 is a vertical sectional view taken on the line 2—2 of Fig. 1;

Fig. 3 is a sectional plan view taken on the line 3—3 of Fig. 2 near the top of the rack;

Fig. 4 is a sectional plan view taken on the line 4—4 of Fig. 2 near the bottom of the rack;

Fig. 5 is a perspective view similar to Fig. 1, illustrating a modified form of lath rack or holder embodying this invention, a group or number of laths being shown clamped in spaced relation thereon;

Fig. 6 is a perspective view of the rear side of the modified form of rack, the lock-bar and laths being omitted;

Fig. 7 is a central sectional plan view of the modified rack shown in Fig. 1;

Fig. 8 is an enlarged fragmentary perspective view of a longitudinal frame member of the rack, showing a guide-plate with movable spacer pins secured to the face thereof; and Fig. 9 is an enlarged perspective view of one of the sliding spacer elements.

Referring to the drawings in which like reference numerals are used to indicate corresponding parts throughout the several views, and more especially to Figs. 1 to 4 inclusive, 5 denotes the longitudinal frame-bars or members of the rack which are braced and held together in substantially parallel relation by cross-bars or members 6, the latter being shown mortised in or over the former and rigidly secured thereto by means of ordinary clamping bolts or screws passing therethrough, said frame-bars and said cross-bars if desired, being extensible for the obvious purpose of lengthening or broadening the rack to accommodating dimensions for use in applying laths to large or restricted areas of wall and ceiling. Projecting pins or pegs 7 are arranged in spaced alinement longitudinally of the frame-bars along the front faces thereof at opposing corresponding levels, to provide supports upon which the laths may rest transversely of the rack in substantially parallel and properly spaced relation thereagainst, the frame-bars being shown further provided with projecting spaced nibs or sharp pointed pins 8, arranged longitudinally thereof in alinement above the pegs and adapted (upon application of slight pressure of the laths thereagainst) to penetrate or engage in the latter sufficiently to hold them from longitudinal movement, thus preventing the laths from sliding off or out of the rack.

A removable and preferably extensible lock-bar 9, having a lifting bail 10 and an end or head-plate 11 of angular form, is provided as an overextending clamp to hold the laths flat or flush against the front faces of the frame-bars, said lock-bar being shown disposed intermediate and substantially parallel with said frame-bars across the top surfaces of the spaced laths assembled thereon, with its angular plate 11 engaging over the topmost lath, and held in binding or repressing position over the several laths by means of shackle-rods 12 and 13 extending forwardly at substantially right angles respectively from the bottom and top cross-bars. The shackle 12 is preferably of U-shaped form, having its arms extremitally secured in the bottom cross-bar, one of said arms being shouldered and threaded for attachment therethrough by means of an ordinary nut as shown, thus providing an arched or engirding bracket through which the lower end of the lock-bar may be inserted, the shackle 13 being preferably of L-shaped form, having its longer shank or arm extending through and swiveled in the top cross-bar, an actuating lever 14 being shown connected and keyed thereon, by which the rod may be moved or turned with its angular free end engaging over the lock-bar to lock or hold the same in position as illustrated in Fig. 1. Obviously, said lever may be formed integrally with the shackle-rod 13, or any other form of lever than that herein shown, may if preferred, be employed.

Referring now to Figs. 5 to 9 inclusive, the rack may be slightly modified in form in the manner shown, to provide movable rather than fixed spacer pins or means for the laths. The illustrated modification is substantially the same as that shown in Figs. 1 to 4 inclusive, except for additional features included for the purpose mentioned. In said modification, cross-bars or members 15 are secured to the longitudinal frame-bars 5 of the rack, intermediate its end cross-bars 6, to provide a central truss or yoke 16 for the lock-rod or shackle 13 with actuating lever 14, said lock-rod in this instance, being located centrally of the rack, rather than at the top thereof as shown in Fig. 1.

Elongated bars or plates 17 having slotted longitudinal guide-ways, are shown secured to the front faces of the longitudinal frame bars or members 5 of the rack, and spacer elements 18 are shown adapted to free sliding movement in or along the guide-ways of said plates, the extremities of the latter being beveled or otherwise closed to prevent the spacer elements from sliding out of place. The spacer elements referred to, are formed or provided with outwardly projecting or extended studs or pins providing spacers and rests for the laths in place of the fixed pins or pegs 7 of the rack illustrated in Fig. 1, and the laths by such means are similarly arranged in spaced relation on the modified form of rack as shown in Fig. 5.

Referring to Fig. 9, spacer elements 18ª having "squared" or widened extensions rather than the studs or pins of the spacer elements 18, may if desired, be employed in said guide-ways in place of the latter, in order to cause a wider spacing of the laths than the spacers 18 would permit. The lock-bar 9 is clamped over the laths when placed on said rack, similarly to the manner in which it is secured on the rack illustrated in Fig. 1, except that the lock-rod or shackle 13 in the latter instance, engages centrally over the bar rather than over its upper end, and a heel-plate 19 is shown secured on said bar to prevent wear otherwise resulting from the repeated movement of the shackle 13 thereover. An angularly bent rod 20 corresponding with the head-plate 11, and adapted to clamp or engage over the topmost lath for the same purpose as the latter, is also shown on the upper end of the bar.

In use, the rack (of either form) is laid face upward across wooden-horses or upon the floor and the proper number of laths are arranged serially thereacross between corresponding spaced pegs or spacer elements of the frame-bars, with their ends in alinement, after which the lock-bar is placed across the top surfaces of the laths with its free end extending through the shackle 12 and its angular head-plate or rod engaging over the topmost lath, the lever 14 being then turned to move the angular free end of the shackle 13 in holding engagement over the bar and causing the latter to clamp or press the laths firmly against the frame-bars. The rack may then be lifted and held in place against a wall or ceiling with the laths overlying the area to which they are to be applied, and the lock-bar disposed between adjacent studs or joists, the lower ends of the frame-bars and said lock-bar, being straddled over the lath last nailed in place, thus forming a clamp to steady the lower end of the rack while the group of laths assembled thereon are likewise nailed successively in place, the top lath preferably being nailed before the others so as to steady and hold the rack to wall or ceiling at both ends while the remaining laths are being applied, after which the lever 14 is moved to turn the shackle-rod 13 with its angular end out of engagement with the lock-bar, whereupon said bar may be lifted and withdrawn from behind the nailed laths, thus permitting the rack to be removed or lowered from place against the wall or ceiling for reassembly with another group of laths.

From the foregoing description, it will be readily understood that with my improved rack or holder, a carpenter or "lather" may efficiently apply laths over a given area in much less time than it would ordinarily take for him to nail them in place one at a time in the usual way, especially when a helper is employed to assemble and pass the racks ready for application in place, the work being greatly expedited by the use of several racks of the character described, it being necessary for the lather to apply and hold the rack in place only while driving nails through the topmost lath, after which nails may be quickly driven through the remaining laths on each rack, the worker having free use of both hands.

The simplicity, convenience and value of my invention, are thought to be obvious from the foregoing specification, and further description thereof would seem to be unnecessary. Since various minor changes may be made in the details of construction and arrangement of parts without departing from the spirit and scope of my invention, I do not desire to be limited by the appended claims to the specific structure hereinbefore illustrated and described.

Having thus described my invention, what I claim as new and desire to secure by Letters Patent of the United States is:

1. A lath rack comprising an oblong frame having projecting pegs spaced along longitudinal members thereof, a lock-bar securable on the rack intermediate said members in spaced relation therefrom and means for compressingly holding said lock-bar in place thereon.

2. A latch rack comprising an oblong frame having projecting pegs correspondingly spaced in alinement along the front faces of longitudinal members thereof, a lock-bar attachable over the rack intermediate said members in spaced relation from the plane thereof, and shackle-rods engageable over said lock-bar for compressingly holding the same in place to the frame.

3. A lath rack comprising an oblong frame having correspondingly spaced projecting pegs arranged in alinement along the outer faces of its opposed longitudinal members upon which a number of laths are rested in spaced relation against the frame, an overextending lock-bar securable intermediate said members in spaced relation from the plane thereof, and shackle-rods fixed in said frame and engageable over said lock-bar for compressingly holding the same in clamping position over the laths assembled thereon.

4. A lath rack comprising an oblong frame having spaced projecting pegs arranged in alinement along the opposed longitudinal members thereof at corresponding points to provide rests upon which a number of laths may be laid in spaced relation transverse the rack, a lock-bar securable intermediate said members across the surfaces of said laths, and shacklerods fixed in said frame and engageable over said bar for compressingly clamping the laths in place on the frame.

5. A lath rack comprising an oblong frame having projecting pegs arranged in spaced alinement at corresponding points along the outer faces of opposed longitudinal members thereof providing rests for laths which are laid thereon in spaced relation transverse the rack, an overextending lock-bar securable intermediate said members across the lath surfaces with one end engaging over the topmost lath thereon, and means for compressingly holding said lock-bar in place on the rack with the laths firmly clamped between said members and said bar.

6. A lath rack comprising an oblong frame having spaced projecting pegs arranged at corresponding points in alinement along outer faces of its longitudinal members upon which a number of laths are supported and held in spaced relation transversely thereof, an overextending lock-bar securable between said members across the surfaces of the laths to press and clamp the latter in place on the rack, said bar having a lifting bail and head-plate engageable over the topmost lath thereon and releasable means carried by the rack for securing said bar in clamping position over the laths.

7. A lath rack comprising an oblong frame formed by opposing longitudinal and transverse bars, the former having spaced projecting pegs arranged in alinement at corresponding points along the front faces thereof upon which a number of laths are supported and held in spaced relation transversely of the rack, a lock-bar cooperantly securable between said longitudinal bars across the laths placed thereon, and shackle-rods fixed respectively in said cross-bars and engageable over said lock-bar for compressingly holding the latter in clamping contact with the laths, one of said shackles being of substantially U-shape form adapted to arched engagement over one end of the lock-bar, the other of said shackles being of substantially L-shaped form and having a lever for axially turning the same with its angular end engaging over the other end of said bar.

8. A lath rack comprising an oblong frame having projecting spacer elements slidably movable along longitudinal members thereof; a lock-bar securable on the rack intermediate said members and in spaced relation therefrom; and means for compressingly holding said lock-bar in place thereon.

9. A lath rack comprising an oblong frame having corresponding extended spacer elements slidably movable in alinement along the front faces of longitudinal members thereof; a lock bar attachable over the rack intermediate said members and in spaced relation therefrom; together with shackle-rods engageable over said lock-bar for compressingly holding the same in place to the frame.

10. A lath rack comprising an oblong frame having projecting spacing elements arranged to slide in guide-ways along the outer faces of the longitudinal members thereof, upon which a number of laths are placed in spaced relation against the frame; an elongated lock-bar securable intermediate said members and overextending the laths arranged thereagainst; together with shackle-rods secured in said frame and engageable over said lock-bar for compressingly holding the same in clamping position over the laths assembled thereon.

11. A lath rack comprising an oblong frame having spacer elements slidably movable in guide-ways along longitudinal members thereof to provide rests upon and between which a number of laths may be arranged in spaced relation transversely of the rack against said members; a lock-bar securable intermediate said members across the top surfaces of said laths; and shackle-rods secured in said frame and engageable over said bar for compressingly clamping the same with the laths in place to the frame.

12. A lath rack comprising an oblong frame having spacer elements slidably movable in guide-ways longitudinally of the longitudinal members thereof, upon and between which a number of laths are supported and held in spaced relation transversely of the rack; a lock-bar securable intermediate the longitudinal members of the rack across the laths arranged thereon; and shackle-rods secured in the cross-bars of the rack and engageable over said lock-bar for compressingly holding the latter to the rack in clamping contact over the laths.

In testimony whereof I affix my signature.

EUGENE GILLETT.